Figure 1:
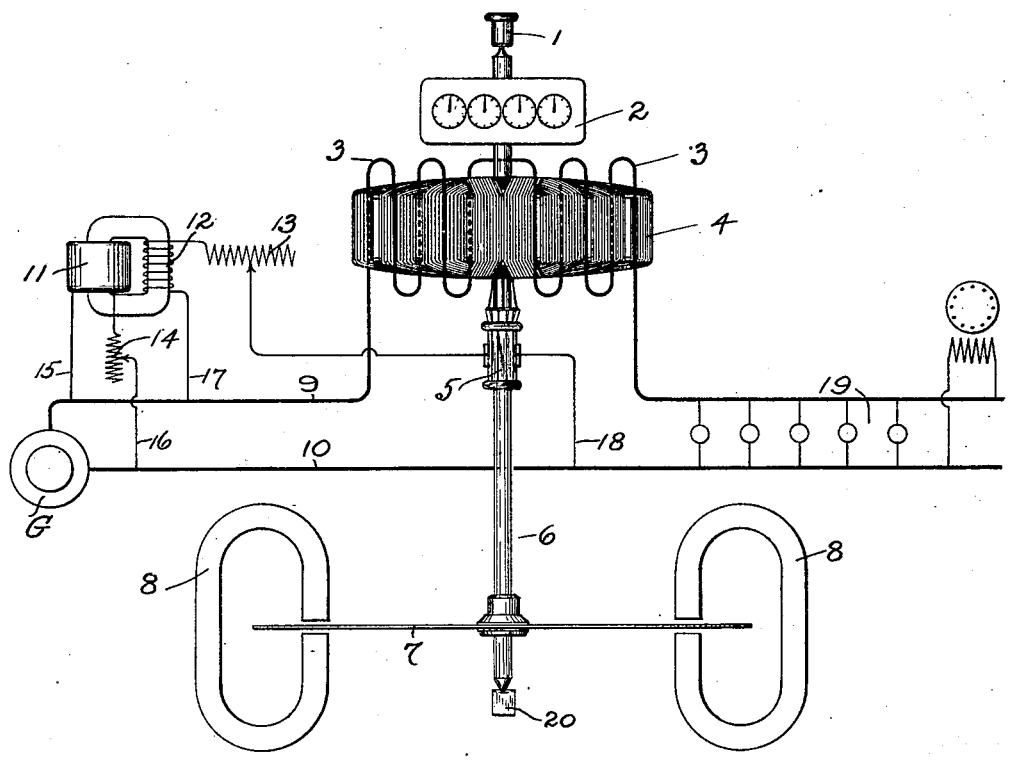

No. 698,675. Patented Apr. 29, 1902.
T. DUNCAN.
ELECTRIC METER.
(Application filed Nov. 27, 1899.)
(No Model.) 2 Sheets—Sheet 1.

WITNESSES: Samuel R. Bachtel. William F. Meyer.

INVENTOR. Thomas Duncan

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,675, dated April 29, 1902.

Application filed November 27, 1899. Serial No. 738,287. (No model.)

*To all whom it may concern:*

Be it known that I, THOMAS DUNCAN, a citizen of the United States, and a resident of Chicago, in the county of Cook and State of Illinois, have invented certain new and useful Improvements in Electric Meters, of which the following is a specification.

The invention relates to improvements in motor-meters for alternating currents, and particularly to the type known in the art as "commutated" and "contact" meters.

The object of the invention is to provide a meter of the commutated type, whose magnetic field that is produced by the armature-windings will be exactly in phase with the impressed electromotive force. In meters of this class or those in which the electromotive force is represented by the shunt-windings of the armature it is necessary that the magnetism produced by the armature should be exactly in phase with the electromotive force in order to make the readings of the meter correct on inductive loads. Meters with shunt-wound armatures must necessarily be wound with a great number of turns, so as to keep the energy consumed as low as possible when competing with the induction type of motor-meters, which are much more efficient for alternating-current service than the commutated type. The many turns of wire wound upon the armature causes the shunt-current which traverses it to lag behind the impressed electromotive force by an amount depending upon the self-inductive effect of these turns, and by increasing their number to lessen the energy consumed this self-inductive or lagging effect becomes very manifest, since it increases at a rate proportional to the square of the turns. For this reason it is obvious that some means must be employed to neutralize or compensate for the inductance of the armature-circuit in order that the turns may be increased by any practical amount to reduce the energy as much as possible or to the same amount as is consumed in the most modern types of induction motor-meters.

In measuring the true watts on inductive loads the meter must have a magnetic field that is coincident in phase with the pressure; otherwise the indication will only be approximate. If it be assumed, for example, that the inductance of the armature causes the current through it to lag ten degrees, then the meter will register only about ninety-eight per cent. of the actual power instead of one hundred per cent.; and if the current be caused to lag ninety degrees behind the pressure the meter will continue to rotate, since the phase difference between the magnetism of the armature and the magnetism of the series coils will be only eighty degrees and would require a lag of one hundred degrees between the impressed electromotive force and the current before the meter would cease to rotate, whereas it ought to stop when the angle of lag is ninety degrees.

Figure 2:
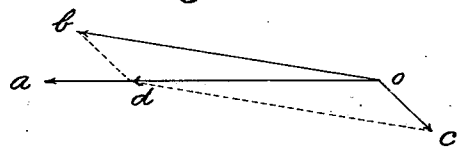
Figure 3:
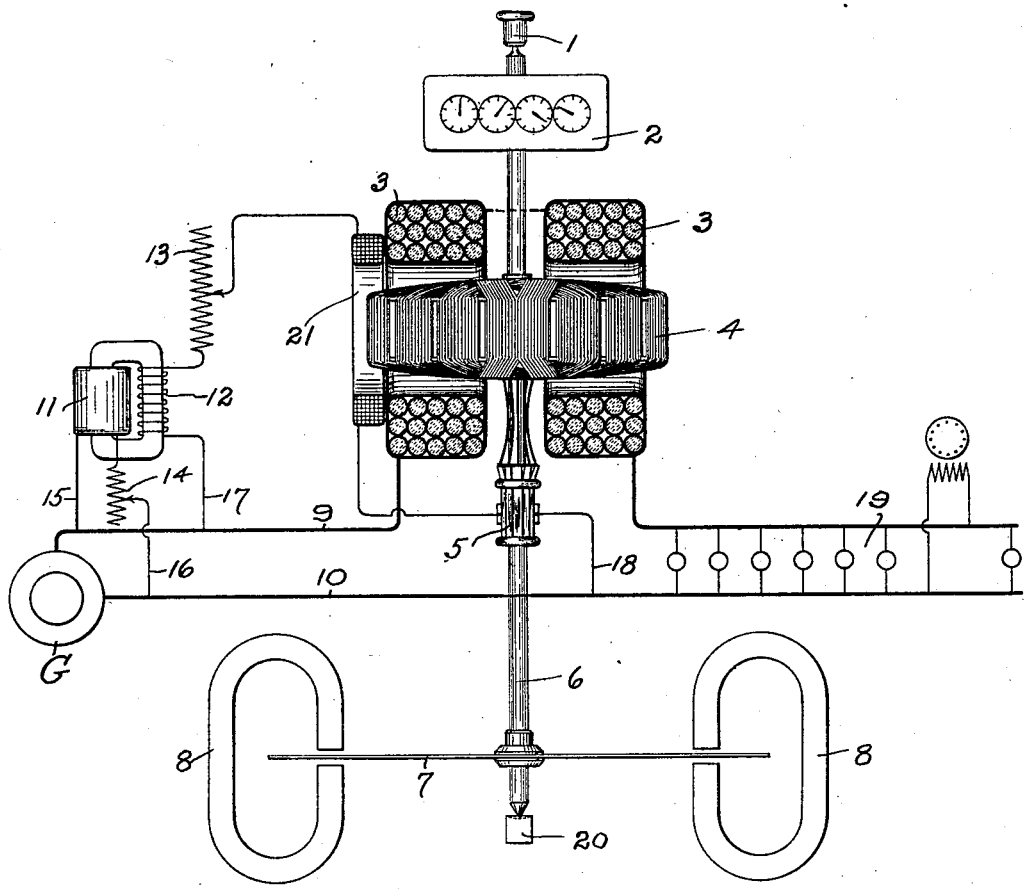

In the accompanying drawings, which form part of this specification, Figure 1 is a front elevation of the revoluble parts of the meter comprising the armature, spindle, commutator, and damping-disk; also, a diagrammatic view of the series field-coils, together with the other requisites of the device. Fig. 2 is a vector diagram showing the phase relations of the electromotive force and the currents and magnetism of the shunt-circuit. Fig. 3 shows the series field-coils in section and the use of an auxiliary coil to compensate for friction of the bearings of the meter.

In describing the improvement with reference to the foregoing figures I employ a generator G of alternating currents for supplying the translating devices 19 with the mains 9 and 10. A series winding or field coil 3 is connected into circuit with one of the mains and is traversed by the current supplied to the translating devices. A revoluble armature 4 is mounted upon a spindle 6, which also carries the disk 7 and the commutator 5. The commutator is connected to the windings of the armature in the ordinary manner and to the supply-mains by means of the wires 17 and 18. The circuit 17 and 18 includes the armature 4, the variable non-inductive resistance 13, and the coil or winding 12. The current through the series coil 3 sets up a magnetic field that is in phase with the current supplying the translating devices and in phase with the impressed electromotive force when the load is non-inductive, and in order that the meter measure accurately when the load is inductive it is necessary that the magnetism set up by the armature be always exactly in phase with the electromotive force.

Since it is impractical to obtain a shunt-circuit through the armature-circuit that does not lag behind the pressure due to the self-induction of the turns comprising the armature-coils, I employ a coil 12, in which is induced a secondary current by the action of the coil or primary 11 and combine this secondary with the current derived in shunt from the mains 9 and 10 into a resultant current which traverses the armature-circuit and is exactly in phase with the electromotive force of the supply-mains. The manner in which this is accomplished is shown in Fig. 2, in which the line $o\,a$ represents the phase of the pressure in volts, the line $o\,b$ the current through the armature as derived in shunt from the mains 9 and 10, the line $o\,c$ the secondary current induced in the coil 12, which is also in series with the armature, and the line $o\,d$ the resultant of the currents $o\,b$ and $o\,c$. Therefore the line $o\,d$ is the effective current traversing the armature, and since the current and magnetism are in phase the line $o\,d$ also represents the magnetism of the armature and is in phase with the pressure or line $o\,a$. This being the case, the meter will accurately measure the "true" watts for any angle of lag in the translating devices. By this means the number of turns upon the armature may be increased over those now used, and the increased self-induction produced thereby can be compensated for in the foregoing manner. This permits of the energy consumed in the armature-circuit being reduced (by increasing the turns) to an amount within the range of the most modern induction motor-meters.

A variable resistance 14 is connected in series with the primary or inducing coil 11 to vary the angle and magnitude of the current $o\,c$ in Fig. 2. The wires 15 and 16 supply the coil 14 with current from the mains 9 and 10.

The revolutions of the armature are integrated by the mechanism 2 of any well-known construction. The spindle rests upon a suitable bearing 20 and is held in position at the top by a bearing 1.

To make the speed of the meter proportional to the torque and to the watts, the usual magneto-electric brake is employed and here comprises a metallic disk secured to and revoluble with the spindle and is embraced in its revolution between the poles of the permanent magnets 8 and 8.

To overcome the friction of the meter and secure accuracy of reading for small loads, I have shown the coil 21 connected in series with the armature-circuit. The magnetic axis of this coil is coincident with the series coil 3, and its operation is well known by those skilled in the art. When this coil is employed, its self-induction is also compensated for by the action and magnitude of the secondary 12, since it is in series with the armature.

The improvement may also be applied to other forms of shunt-wound meters, such as clock and oscillating types or those in which the shunt-current in a coil or coils is reversed either periodically or by the movement of the meter itself, without departing from the scope or spirit of the invention.

I claim—

1. In an alternating-current meter a series coil, a shunt-wound armature, a phase-changing coil in series with said armature, and extraneous means associated with said phase-changing coil for bringing the field due to said armature in phase with the circuit-pressure, substantially as described.

2. In an alternating-current meter a series coil, a shunt-wound armature representing the electromotive force, a phase-changing coil in circuit with said shunt-wound element and extraneous means associated with said phase-changing coil for varying the phase relations of the circuit including said phase-changing coil and said shunt-wound armature, and bringing the field due to the shunt-wound element in phase with the circuit-pressure, substantially as described.

3. In an alternating-current meter, a series coil, a shunt-wound armature representing the pressure-receiving current from the circuit-mains, a non-inductive resistance in series with said armature, a phase-changing coil in series with the said armature and the non-inductive resistance, an inducing-coil in coöperative relation with the phase-changing coil, and means associated with the circuit including the phase-changing coil and the armature for bringing the field due to the armature in phase with the circuit-pressure, substantially as described.

4. In an alternating-current meter a series coil; a shunt-wound armature; means connected with the circuit-mains for conducting current through the windings of said armature; a phase-changing coil in series with said armature; a non-inductive resistance in series with the armature and phase-changing coil; and an inducing-coil in inductive relation to the phase-changing coil also connected with the circuit-mains; and a variable resistance in series with said inducing-coil.

5. In an alternating-current meter a series coil; a shunt-wound armature metallically connected to and receiving current from the circuit-mains; a commutator for said armature; a non-inductive resistance in series with said armature; a phase-changing coil also receiving current from the circuit-mains in coöperative relation with the shunt-wound armature and non-inductive resistance serving to bring the field due to the armature in phase with the pressure; and means for retarding the revolutions of said armature.

6. In an alternate-current electric meter a series coil; a shunt-armature winding, the magnetism of which varies as the pressure in volts; said armature receiving its current conductively from the circuit-mains; a resistance in series with said shunt or armature winding; a phase-changing coil in coöperative relation with the shunt or armature winding; an inducing-coil also receiving current conductively from the said circuit-mains in inductive relation with the phase-changing coil; a variable resistance in series with the inducing-coil; and an integrating mechanism.

7. In an alternating-current electric meter a series coil, a revoluble shunt-wound armature, a transformer comprising a primary or inducing coil, a secondary or phase-changing coil, the primary connected to the source of pressure and the secondary connected in series with the shunt-wound armature and a variable resistance in series with the primary or inducing coil, and serving to accurately place the magnetism due to the armature in phase with the pressure, said armature also receiving current conductively from the source of pressure substantially as described.

8. In an alternating-current meter, the combination with a shunt-wound armature, said armature being adapted for connection with circuit-mains, of an electromagnetic phase-changing device associated extraneously with the armature-circuit, for bringing the effective magnetism due to said armature-circuit in phase with the circuit-pressure, substantially as described.

In testimony that I claim the foregoing as my invention I affix my signature, in the presence of two subscribing witnesses, this 11th day of November, A. D. 1899.

THOMAS DUNCAN.

Witnesses:
    JAMES W. DALTON,
    WM. F. MEYER.